US012762953B2

(12) United States Patent
Holder et al.

(10) Patent No.: US 12,762,953 B2
(45) Date of Patent: Oct. 13, 2026

(54) METHOD AND APPARATUS FOR PROVIDING A QUANTITY OF DECISION POINTS FROM A BACKEND SERVER TO A VEHICLE DURING A DRIVING PROCESS

(71) Applicant: Bayerische Motoren Werke Aktiengesellschaft, Munich (DE)

(72) Inventors: Stefan Holder, Munich (DE); Martin Wernwag, Garching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 80 days.

(21) Appl. No.: 18/856,791

(22) PCT Filed: Feb. 24, 2023

(86) PCT No.: PCT/EP2023/054675
§ 371 (c)(1),
(2) Date: Oct. 14, 2024

(87) PCT Pub. No.: WO2023/222274
PCT Pub. Date: Nov. 23, 2023

(65) Prior Publication Data

US 2025/0259543 A1 Aug. 14, 2025

(30) Foreign Application Priority Data

May 16, 2022 (DE) ..................... 10 2022 112 169.0

(51) Int. Cl.
*G08G 1/0968* (2006.01)
*G01C 21/34* (2006.01)

(52) U.S. Cl.
CPC ... *G08G 1/096827* (2013.01); *G01C 21/3415* (2013.01)

(58) Field of Classification Search
CPC ...................... G08G 1/096827; G01C 21/3415
See application file for complete search history.

(56) References Cited

U.S. PATENT DOCUMENTS

| | | | |
|---|---|---|---|
| 9,002,646 B1 | 4/2015 | Wan et al. | |
| 9,261,376 B2 * | 2/2016 | Zheng ................ | G01C 21/3484 |

(Continued)

FOREIGN PATENT DOCUMENTS

| | | |
|---|---|---|
| DE | 19844289 A1 | 4/2000 |
| DE | 102011075351 A1 | 11/2012 |

(Continued)

OTHER PUBLICATIONS

International Search Report corresponding to International Patent Application No. PCT/EP2023/054675, dated Jun. 6, 2023 (5 pages).

(Continued)

*Primary Examiner* — Gertrude Arthur Jeanglaude
(74) *Attorney, Agent, or Firm* — Maginot, Moore & Beck LLP

(57) ABSTRACT

A method for obtaining a quantity of decision points from a backend server to a vehicle during a driving process using the vehicle includes sending a first request message to request a first quantity of decision points from the vehicle to the backend server. The method also includes receiving from the background server the first quantity of decision points using the vehicle, responsive to the first request message. The method further includes determining a traversal of a decision point of the first quantity of decision points using the vehicle. If a decision point from the first quantity of decision points has been traversed, then a second request message is sent to request a second quantity of decision points from the vehicle to the backend server, and the second quantity of decision points is received from the background server using the vehicle, responsive to the second request message.

20 Claims, 4 Drawing Sheets

(56) References Cited

U.S. PATENT DOCUMENTS

| | | | | |
|---|---|---|---|---|
| 9,618,353 | B2 * | 4/2017 | Ruys | G01C 21/3676 |
| 9,816,827 | B1 * | 11/2017 | Slusar | G01C 21/3691 |
| 2001/0049581 | A1 * | 12/2001 | Kane | G08G 1/123 701/410 |
| 2004/0083195 | A1 * | 4/2004 | McCord | H04M 3/5233 707/999.107 |
| 2014/0309914 | A1 | 10/2014 | Scofield et al. | |
| 2015/0160025 | A1 | 6/2015 | Konig | |
| 2017/0314944 | A1 * | 11/2017 | König | G01C 21/3484 |
| 2017/0314945 | A1 | 11/2017 | Konig et al. | |
| 2017/0328721 | A1 | 11/2017 | Manoliu et al. | |
| 2018/0297606 | A1 * | 10/2018 | Luo | G01G 19/021 |
| 2019/0235505 | A1 * | 8/2019 | Li | G08G 1/163 |
| 2021/0293557 | A1 * | 9/2021 | Vigild | G01C 21/3617 |

FOREIGN PATENT DOCUMENTS

| | | | |
|---|---|---|---|
| DE | 102010023942 | B4 | 1/2018 |
| EP | 3209969 | A1 | 8/2017 |
| EP | 2867617 | B1 | 3/2019 |
| WO | 2010072258 | A1 | 7/2010 |

OTHER PUBLICATIONS

Written Opinion corresponding to International Patent Application No. PCT/EP2023/054675, dated Jun. 6, 2023 (4 pages).

German Search Report corresponding to German Patent Application No. 10 2022 112 169.0, dated Dec. 13, 2022. (8 pages).

* cited by examiner

METHOD AND APPARATUS FOR PROVIDING A QUANTITY OF DECISION POINTS FROM A BACKEND SERVER TO A VEHICLE DURING A DRIVING PROCESS

The present application is the U.S. national phase of PCT Application PCT/EP2023/054675 filed on Feb. 24, 2023, which claims priority of German patent application No. 10 2022 112 169.0 filed on May 16, 2022, the entire contents of which are incorporated herein by reference.

TECHNICAL FIELD

The disclosure relates to vehicles, and more particularly, to methods and apparatus providing a quantity of decision points from a backend server to a vehicle during a driving process using the vehicle.

BACKGROUND

It is known to predict a driving destination of a vehicle and to transmit it to a vehicle. This can result in a delay in the vehicle destination being available within the vehicle.

There is a need, therefore, to provide navigation data to a vehicle more efficiently. In particular, there is a need to control more efficiently how navigation data, in particular one or more decision points and/or one or more navigation targets, are provided from a backend server to a vehicle.

SUMMARY

The above-described need, as well as others, are addressed by the features of the independent claims. Advantageous embodiments and developments follow from the dependent claims.

A first embodiment is a method for providing a quantity of decision points from a backend server to a vehicle while the vehicle is driving. The method can be a computer-implemented method and/or a control-device-implemented method. The method can, in addition to the quantity of decision points, further navigation data, in particular one or more navigation targets. A navigation target can be a predicted navigation target. A decision point from the quantity of decision points can be a waypoint, where routes driven by the vehicle branch to different navigation targets. The method can provide, in addition to the quantity of decision points, one or more first navigation targets to the vehicle from the backend server while the vehicle is driving. The first navigation target or the multiple first navigation targets can be predicted by server the backend using historical navigation targets of the vehicle. The vehicle can be a land-based vehicle. For example, the vehicle can be a motor vehicle or a motorcycle. Preferably, one or more decision points of the quantity of decision points and/or one or more navigation targets are navigation data, which is provided by the method from the backend server to the vehicle.

The method comprises sending a first request message to request a first quantity of decision points from the vehicle to the backend server. For example, the first request message can be sent at the beginning of a driving process. Further, the method comprises receiving the first quantity of decision points in response to the first request message by the vehicle from the backend server. In addition to the first quantity of decision points, the vehicle can receive one or more first navigation targets from the backend server. Further, the method comprises determining a traversal of a decision point from the first quantity of decision points by means of the vehicle. If a decision point from the quantity of decision points has been traversed, the method comprises transmitting a second request message for requesting a second quantity of decision points from the vehicle to the backend server, and receiving the second quantity of decision points by the vehicle from the backend server in response to the second request message. In addition, the method can request one or more second navigation targets with the second request message and receive them from the backend server. Furthermore, the method can receive, together with the second navigation target or the second navigation targets, a probability associated with the respective second navigation target. The probability associated with a respective second navigation target may differ from a probability associated with the respective first navigation target, even if the first navigation target is the same as the second navigation target. The probability indicates the probability that a user will drive to the first or second navigation target associated with the probability.

Advantageously, the method can request data, in particular decision points, from a backend server more efficiently. When the vehicle traverses a decision point, the method can again request a new quantity of decision points from the backend server. A predicted navigation target can be made available to a user of the vehicle more efficiently, in particular faster. Furthermore, the method can efficiently control the requesting of decision points and/or of predicted navigation targets from the backend server. Unnecessary queries relating to decision points and/or navigation targets, in particular predicted navigation targets, from the backend server can be efficiently prevented. An efficient requesting of decision points and/or navigation targets may be characterized in that a response of the backend server comprises different decision points, different navigation targets, and/or changes in probabilities of the navigation targets. By using decision points to request decision points and/or navigation targets, updates of relevant navigation data can thus be efficiently transferred from the backend server to the vehicle.

According to some advantageous embodiments, a decision point can be a waypoint, where routes driven by the vehicle branch to different navigation targets. This allows efficient control of the requesting of additional decision points or additional quantities of decision points.

According to further, advantageous embodiments, a decision point of the first quantity of decision points may have been traversed if the vehicle first drives into a first, predetermined circle around the decision point and then drives out of a second predetermined circle around the decision point. This allows a reliable determination of the traversal of a decision point.

According to further advantageous embodiments, a radius of the first circle may be smaller than a radius of the second circle, and/or the vehicle can receive the radius of the first circle and the radius of the second circle for each decision point with the first quantity of decision points from the backend server. This allows a reliable determination of the traversal of a decision point.

According to further, advantageous embodiments, the method can further comprise receiving the first request message for requesting the first quantity of decision points from the vehicle by means of the backend server, determining the first quantity of decision points by means of the backend server, reducing the number of decision points of the first quantity of decision points by means of the backend server, and sending the reduced first quantity of decision points as the first quantity of decision points in response to the first request message from the backend server to the vehicle. This allows the quantity of decision points to be determined efficiently.

According to further advantageous embodiments, reducing the number of decision points of the first quantity of decision points can comprise—filtering the first quantity of decision points depending on the importance of the decision points, and/or merging decision points lying within a specified radius or multiple specified radii of circles around a position of the decision point, and/or determining a specified maximum number of decision points for the first quantity of decision points, depending on the importance of the decision point. This allows the quantity of decision points to be determined efficiently.

According to further advantageous embodiments, the method can further comprise sending a third request message to request a third quantity of decision points from the vehicle to the backend server, depending on the distance of a current position of the vehicle from a decision point from the first quantity of decision points, and/or sending a third request message to request a third quantity of decision points from the vehicle to the backend server if a latest request exceeds a specified time period, and/or suppressing the first request message, the second request message, and/or the third request message to provide the first quantity, the second quantity, and/or the third quantity of decision points from the vehicle to the backend server, if a distance of the vehicle from a next decision point falls below a specified distance threshold and/or a time period for reaching the next decision point falls below a specified time threshold. This allows a time at which a request message is transmitted from the vehicle to the backend server to be efficiently controlled. Unnecessary requests to the backend server can be efficiently prevented.

According to another aspect, a computer-readable medium provides a quantity of decision points from a backend server to the vehicle during a driving process using the vehicle. The computer-readable medium comprises instructions which, when executed on a control unit and/or a computer, carry out the method described above.

A further aspect is a system for providing a quantity of decision points from a backend server to the vehicle during a driving process using the vehicle, wherein the system is designed to carry out the method described above.

A still further aspect is a vehicle comprising the system described above for providing a quantity of decision points from a backend server to the vehicle during a driving process using the vehicle.

All the features and feature combinations cited in the description above, and the features and feature combinations cited in the description of the figures below and/or shown in the figures alone are applicable not only in the respective combination indicated, but also in other combinations or else in isolation.

The above-described features and advantages, as well as others, will become more readily apparent to those of ordinary skill in the art by reference to the following detailed description and accompanying drawings.

DETAILED DESCRIPTION

Figure 1:
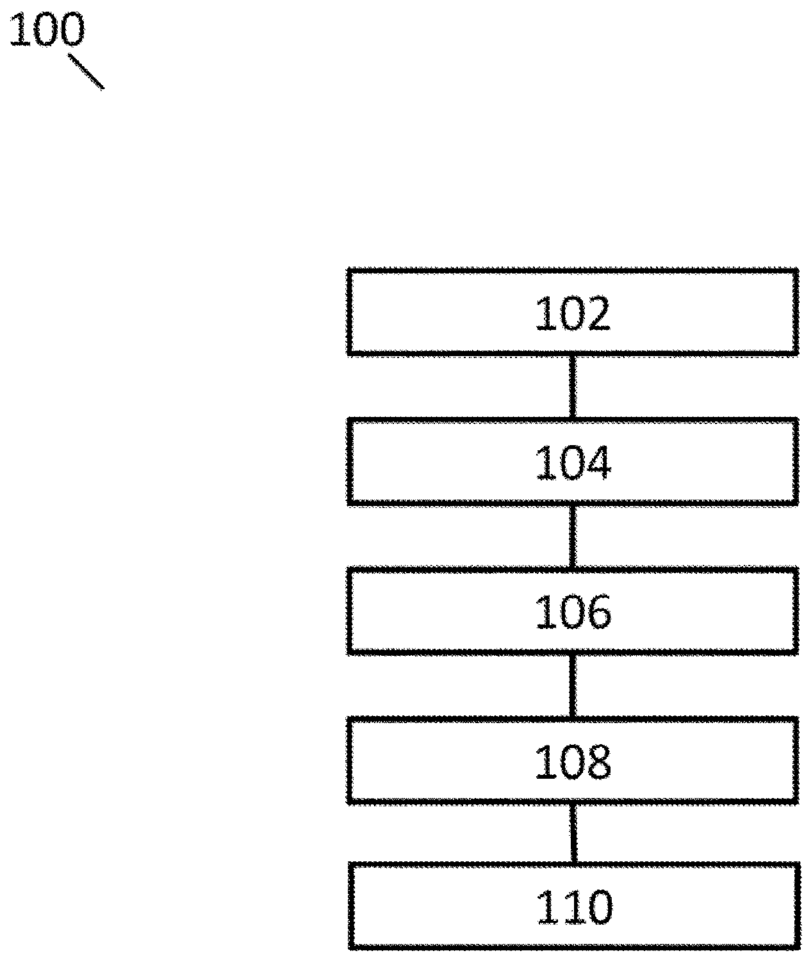
FIG. 1 shows an exemplary method for providing a quantity of decision points.

In detail, FIG. 1 shows a method 100 for providing a quantity of decision points from a backend server to a vehicle during a driving process using the vehicle. The method 100 may transmit a first request message for requesting a first quantity of decision points from the vehicle to the backend server 102. At the beginning of a journey using the vehicle, a prediction of possible navigation targets, hereinafter also referred to as driving destinations, can be made on a backend server and made available to the vehicle. For this purpose, the vehicle can transmit a current position and/or current time information to the backend server at the start of the journey. For example, the vehicle can transmit the current position and/or current time information to the backend server with the first request message. Preferably, the current position of the vehicle is transmitted during each request. The current time information can optionally be transmitted during each request. The backend server can predict one or more driving destinations, for example, using historical driving destinations.

Furthermore, the backend server can determine a quantity of decision points, for example, a first quantity of decision points, a second quantity of decision points, and/or a third quantity of decision points. The quantity of decision points can be determined by the backend server using historical, previously driven vehicle trajectories. The back-end server can receive a driven vehicle trajectory after each journey using the vehicle. The driven vehicle trajectory may comprise a set of vehicle positions determined by the using a satellite-based positioning system. Further, the vehicle can transmit time information for each driven vehicle trajectory at a start, an end, and/or at each vehicle position of the driven vehicle trajectory. For example, from the historical, previously driven vehicle trajectories of a user and/or a vehicle, the backend server can determine positions for waypoints, at which the historical, driven vehicle trajectories branch. A waypoint at which the historical driven vehicle trajectories branch can be one decision point of the quantity of decision points. Furthermore, the backend server can calculate an importance, in particular an importance value, for each decision point. Using the importance, the backend server can filter decision points. For example, the backend server can only add decision points that have a predetermined minimum importance to the quantity of decision points. In addition or alternatively, a maximum number of decision points can be specified for the quantity of decision points. If a maximum number of decision points is specified for the number of decision points, the decision points with the greatest importance can be determined up to the maximum number and added to the quantity of decision points. Alternatively, the decision points with the smallest distance to the current vehicle position can be determined up to the maximum number and added to the quantity of decision points. A decision point can include a position of a waypoint. For example, the position of the waypoint can be specified as latitude and longitude coordinates.

Furthermore, the backend server can reduce the number of decision points by taking into account only decision points that have a maximum distance from the current vehicle position. Alternatively, decision points with the smallest distance from the current vehicle position can be determined, up to a maximum number.

Preferably, the importance of a decision point indicates the probability that traversing the decision point will result in another driving destination being suggested to the user.

The following formula is used:

$$p(\text{different destination than } EP) = \sum_{i=1}^{n} p(\text{out\_path}_i) \times \text{important\_update}(\text{out\_path}_i)$$

where p($\text{out\_path}_i$) is the conditional probability of leaving the decision point EP by the path $\text{out\_path}_i$ under the condition that the decision point EP has been reached; and important_update($\text{out\_path}_i$) is 1 if a different destination is suggested to the user after passing through the decision point, otherwise 0. A minimum probability of the most likely destination is preferably taken into account, from which, for example, a navigation system of the vehicle is started automatically. An important change is also present in this case if the minimum probability is reached only when the decision point is traversed via $\text{out\_path}_i$ or if the minimum probability is no longer reached after traversing the decision point via $\text{out\_path}_i$.

Furthermore, the importance of a decision point defined above can be multiplied by the probability of reaching the decision point from the current vehicle position.

Alternatively, the importance of a decision point indicates the amount of information gain to be expected by the decision point with respect to a predicted route.

For example, the importance of the decision point can be calculated by means of an expected value of the information gain, as follows:

$$E[IG(X)] = \sum\nolimits_{d \in D_X} P(d) \cdot (H(Z) - H(Z \mid d)),$$

where

X is a decision point;

IG is the information gain;

$D_x$ is a quantity of possible traversals through the decision point X; a traversal d is defined by an incoming road segment and an outgoing road segment at a branching point, such as an intersection or roundabout;

P(d): the probability of traversal d of decision point X starting from a current vehicle position;

Z: target probabilities at the current vehicle position;

Z|d: target probabilities after traversal d of the decision point X; and

H: is the entropy.

The sum of the probabilities of all traversals of a decision point $\Sigma_{d \in D_X}$P(d) is equal to the probability of traversing the decision point X from the current vehicle position via any route.

Instead of calculating the importance of decision points and filtering decision points based thereon, the following simple procedure can be used as an alternative. Only routes with a minimum probability of, e.g., 0.1 are taken into account in calculating decision points. Alternatively, only the most probable routes up to a maximum number of routes are taken into account in calculating decision points. Both methods ensure that only the most important decision points are taken into account.

Further, the method 100 can receive 104 a first quantity of decision points in response to the first request message by the vehicle from the backend server. In addition, the vehicle can receive one or more driving destinations from the backend server in response to the first request message. If a destination is received by the vehicle from the backend server, this destination is the most probable destination of the vehicle. If multiple destinations are received by the vehicle from the backend server, these destinations are the most likely destinations of the vehicle. The received destinations can be displayed to a user of the vehicle on a display device of the vehicle and/or on a mobile terminal. The user can select a displayed destination by means of an operator input and activate a route guidance of the navigation system of the vehicle and/or the mobile terminal.

Figure 2:
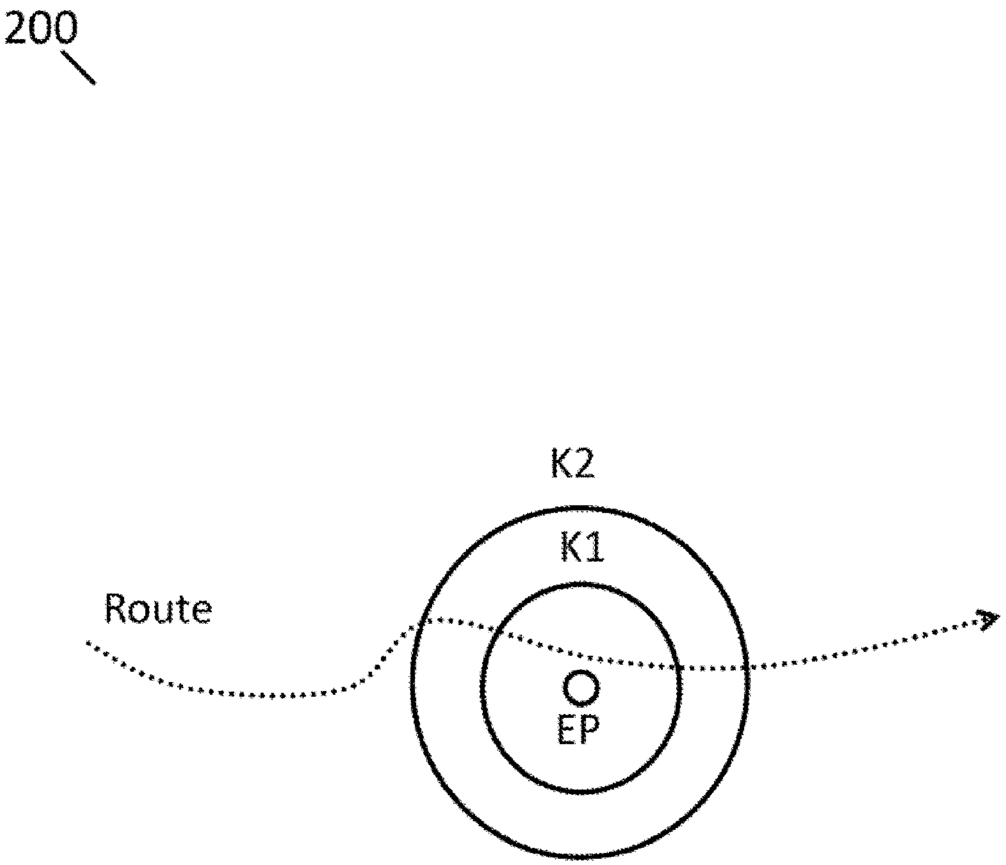
FIG. 2 shows an exemplary scenario for determining a traversal of a decision point.

Further, the method 100 can determine 106 a traversal of a decision point from the first quantity of decision points by the vehicle. In detail, FIG. 2 shows an exemplary scenario 200 for determining a traversal of a decision point EP. A decision point EP can be deemed to have been traversed in the present method 100 if the vehicle (not shown in FIG. 2) along a driven route of the vehicle first enters a circle K1 and then leaves a circle K2. The circle K1 and circle K2 are preferably circles that have a decision point EP as their center point. Further, a radius of circle K1 is smaller than a radius of circle K2. For example, the radius of circle K1 can be 90 m, and the radius of circle K2 can be 100 m. The radii of the circles K1 and K2 can be specified individually for each decision point. Alternatively, the radii of the circles K1 and K2 can be the same for all decision points. The two circles K1 and K2 can represent a hysteresis function, which in the event of an inaccurate signal from a satellite-based positioning system, prevents a scenario in which a circle is entered and the inaccurate signal from the satellite-based positioning system erroneously detects an exit from the circle within a short time interval. Transmitting individual radii for each decision point can have the advantage that multiple decision points can be merged into one decision point with larger radii for the circles K1 and K2. For example, the number of decision points can be reduced by merging adjacent decision points into one decision point by increasing the radii of the circles K1 and K2 of a decision point.

The first quantity of the decision points and/or the destination or destinations received from the backend server can be updated using the method 100 while the vehicle is driving. In particular, a current vehicle position and/or a previously driven route can be information used by the backend server to determine the driving destinations more accurately and to provide updated destinations to the vehicle. Decision points and/or driving destinations can be updated by using decision points from the first quantity of decision points.

In detail, the method 100 can transmit 108 a second request message for requesting a second quantity of decision points from the vehicle to the backend server and receive 110 the second quantity of decision points by means of the vehicle in response to the second request message from the backend server, if a decision point from the first quantity of decision points has been traversed. Alternatively, the second request message may be omitted if the first quantity of decision points already includes all navigation data. Then the vehicle can predict one or more navigation targets by using only the first quantity of decision points.

In addition, the method 100 can request one or more driving destinations from the backend server with the second request message. The backend server can determine the one or more driving destinations, as described above, and additionally transmit the one or more driving destinations to the vehicle in response to the second request message. The vehicle can additionally receive the one or more driving destinations from the backend server in response to the second request message. With each subsequent traversal through a decision point, the vehicle can transmit a further request message, for example a third, a fourth, and/or a fifth request message, to the backend server and in response to each further request message, receive a quantity of decision points and/or one or more driving destinations. For example, the transmission of further request messages can be repeated until such time as a maximum number of request messages has been transmitted and/or a maximum time has elapsed since the start of the journey using the vehicle.

In addition, the method 100 can transmit one or more request messages for providing a further quantity of decision points and/or one or more driving destinations from the vehicle to the backend server in a time-controlled manner. For example, the vehicle can send a request message to the backend server in a time-controlled manner at cyclic intervals, e.g. every 10 minutes. A time-controlled request message to provide an additional quantity of decision points and/or one or more driving destinations from the vehicle has the advantage that, even in the case of a small number of decision points in the quantity of decision points, requests are regularly transmitted to the backend server and current travel destinations and a current quantity of decision points are thereby transmitted from the backend server to the vehicle. The vehicle can therefore always receive current driving destinations and a current quantity of decision points from the backend server. Further, the method 100 can prevent transmission of one or more time-controlled request messages before a decision point is traversed by the vehicle. The method 100 can prevent transmission of a time-controlled request message from the vehicle to the backend server if the vehicle is closer than a predetermined distance, for example 1000 m, to a decision point. In addition or alternatively, the method 100 can prevent transmission of a time-controlled request message from the vehicle to the backend server if an estimated time until a decision point is reached is less than a predetermined threshold value, for example less than 3 minutes. For example, to calculate the estimated time a linear distance or route length from a current position of the vehicle to a decision point can be used to estimate how long it is expected to take to reach the decision point.

By preventing transmission of one or more timed requests, it is possible to prevent timed requests from the vehicle to the backend server over a longer period of time, for example, 10, 20, 30, . . . , 50 minutes, even if no decision point is traversed by the vehicle. This case can occur, for example, when there are a plurality of decision points in the vicinity, i.e. within the predetermined distance to one or more decision points, of a route of the vehicle, which prevent one or more timed requests from the vehicle to the backend server. The vehicle can send a timed request message from the vehicle to the backend server when a specified maximum time, for example 10 minutes, has elapsed since a last request from the vehicle to the backend server. This can prevent the vehicle from failing to send a request to provide a further predicted route and a further quantity of decision points from the vehicle to the backend server over an extended period of time.

Figure 3:
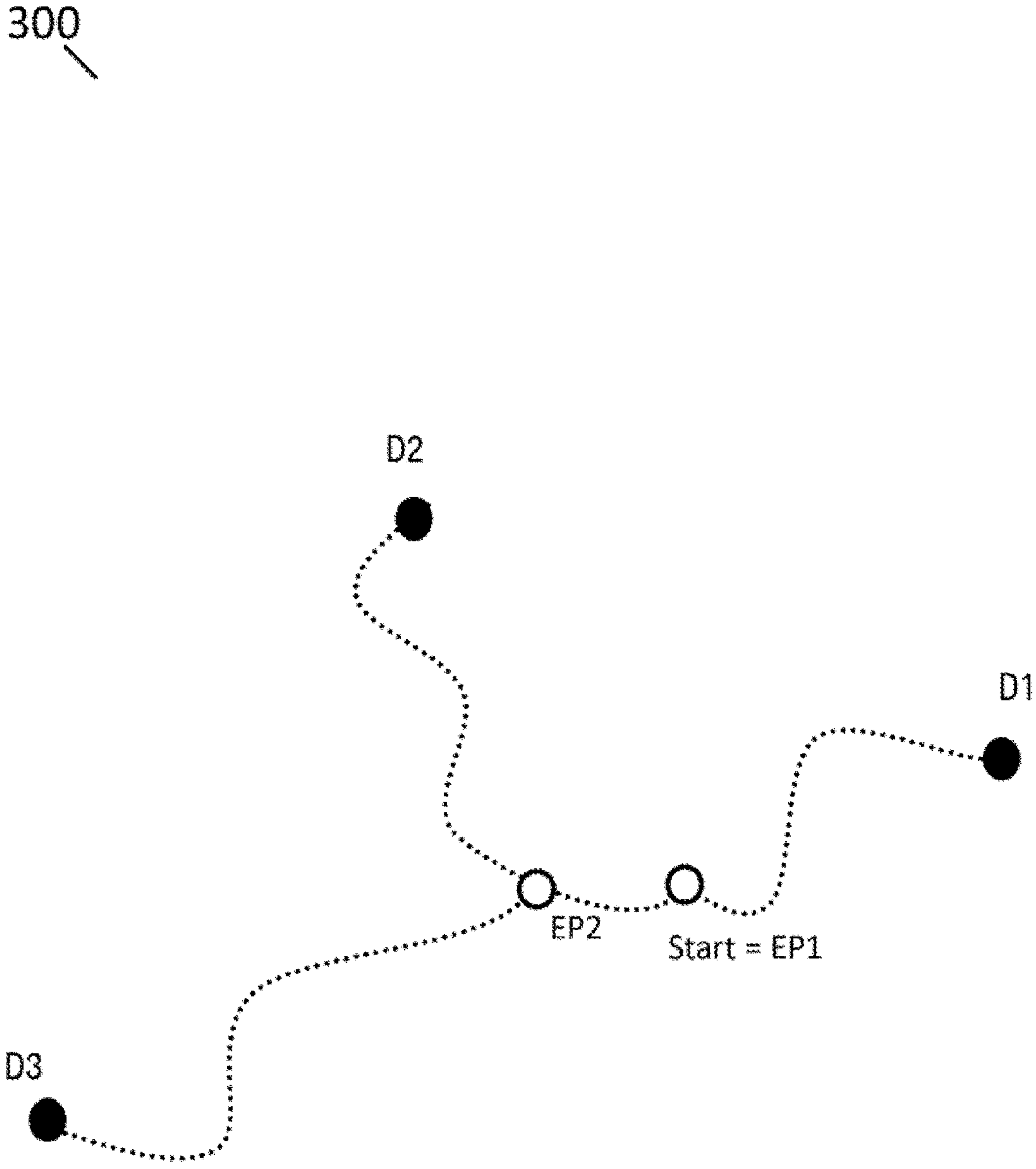
FIG. 3 shows a first scenario with predicted targets and decision points at the beginning of a journey.
Figure 4:
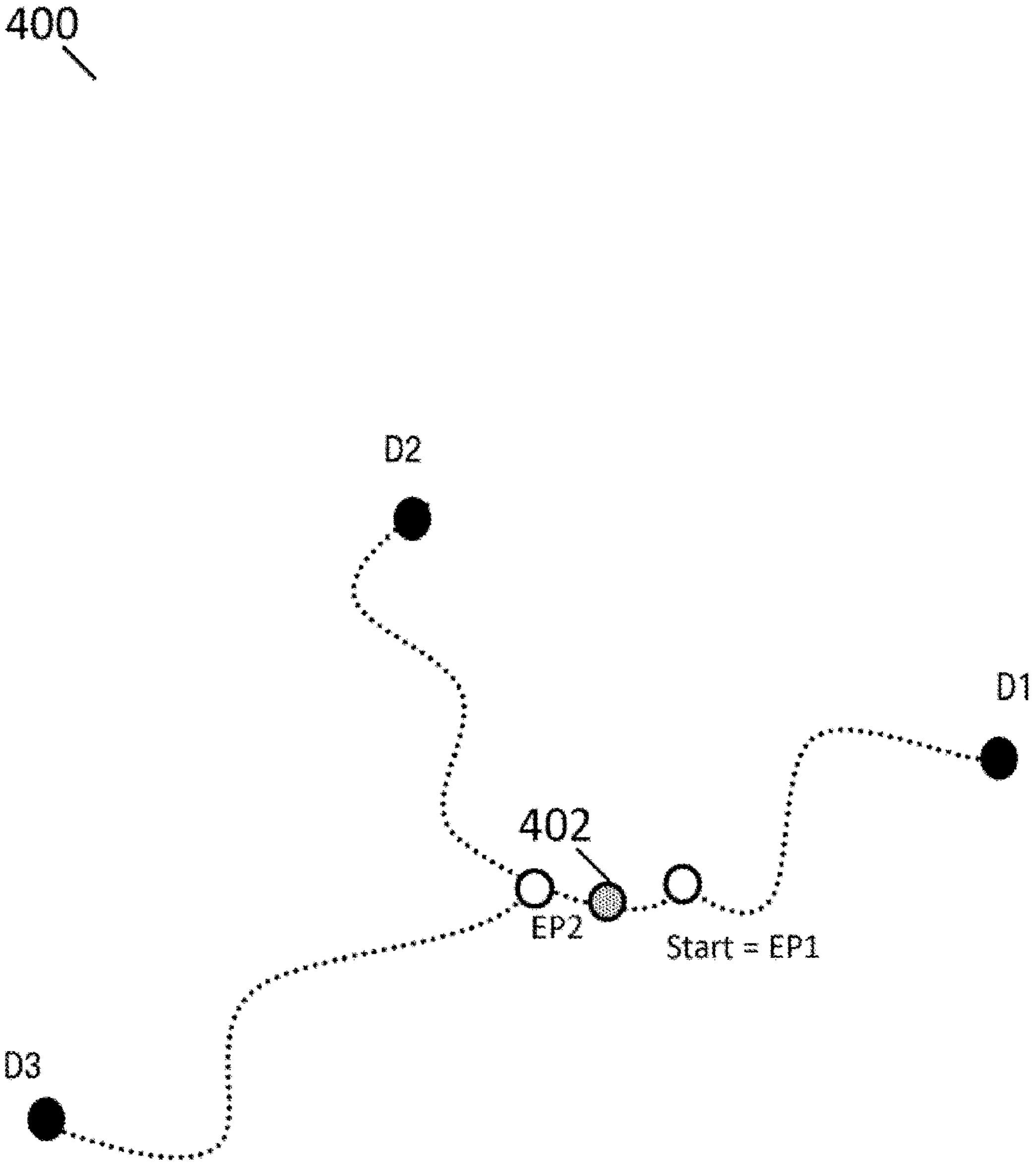
FIG. 4 shows a second scenario with predicted targets and decision points during the journey.

FIG. 3 shows a first scenario with driving 300 destinations and decision points at the beginning of a journey. FIG. 4 shows a second scenario 400 with driving destinations and decision points during the journey. Each of the scenarios 300 and 400 includes three driving destinations D1, D2, and D3, four predicted routes R1, R2, R3, and R4, and two decision points EP1 and EP2. The vehicle starts its journey at decision point EP1. At the start of the journey, the three destinations D1, D2, and D3 are possible destinations of the vehicle starting from decision point EP1. Also, a first quantity of decision points includes the decision points EP1 and EP2. The vehicle can receive the three driving destinations and the first set of decision points from the backend server at the start of the journey. The vehicle 402 travels from EP1 toward EP2. The vehicle can determine that the decision point EP1 has been traversed. If the vehicle has traversed decision point EP1, the vehicle can send a second request message to the backend server. After traversing EP1 in the direction of EP2, the backend server can determine the two driving destinations D2 and D3 as still being possible destinations for the vehicle. For example, a second quantity of decision points may include the decision point EP2. The two driving destinations D2 and D3 can be provided to the user of the vehicle. By means of an operator input, the user can select one of the two destinations and perform a route guidance of the navigation system of the vehicle and/or a mobile terminal to the selected destination.

Advantageously, a time for a request message from a vehicle to a backend server can be efficiently controlled with a quantity of decision points. Only at relevant waypoints during a journey does the vehicle send a request message to the backend server. The number of requests to the backend server can be efficiently reduced compared to purely time-controlled methods, while at the same time keeping the quantity of decision points and/or driving destinations up to date.

LIST OF REFERENCE SIGNS

100 method
102 sending a first request message
104 receiving a first quantity of decision points
106 determining a traversal of a decision point
108 transmitting a second request message
110 receiving a second quantity of decision points
200 scenario
EP decision point
K1 circle
K2 circle
300 first scenario
400 second scenario
402 vehicle

The invention claimed is:

1. A method for obtaining a quantity of decision points from a backend server to a vehicle during a driving process using the vehicle, the method comprising:
- sending a first request message to request a first quantity of decision points from the vehicle to the backend server;
- receiving from the backend server the first quantity of decision points using the vehicle, responsive to the first request message;
- determining a traversal of a decision point of the first quantity of decision points using the vehicle; and
- if a decision point from the first quantity of decision points has been traversed:
  - sending a second request message to request a second quantity of decision points from the vehicle to the backend server; and receiving from the backend server the second quantity of decision points using the vehicle, responsive to the second request message; and sending from the vehicle to the backend server a third request message to request a third quantity of decision points, depending on a distance of a current position of the vehicle from at least one decision point from the first quantity of decision points.

2. The method as claimed in claim 1, wherein at least one of the first quantity of decision points is a waypoint at which routes driven by the vehicle branch to different navigation targets.

3. The method as claimed in claim 1, wherein the decision point from the first quantity of decision points is a waypoint at which routes driven by the vehicle branch to different navigation targets.

4. The method as claimed in claim 3, wherein the decision point of the first quantity of decision points has been traversed when the vehicle first drives into a first, predetermined circle around the decision point and then drives out of a second predetermined circle around the decision point.

5. The method according to claim 4, wherein a radius of the first circle is smaller than a radius of the second circle.

6. The method according to claim 5, wherein the vehicle receives the radius of the first circle and the radius of the second circle for each decision point with the first quantity of decision points from the backend server.

7. The method as claimed in claim 1, wherein the decision point of the first quantity of decision points has been traversed when the vehicle first drives into a first, predetermined circle around the decision point and then drives out of a second predetermined circle around the decision point.

8. The method according to claim 7, wherein a radius of the first circle is smaller than a radius of the second circle.

9. The method according to claim 8, wherein the vehicle receives the radius of the first circle and the radius of the second circle for each decision point with the first quantity of decision points from the backend server.

10. The method according to claim 7, wherein the vehicle receives the radius of the first circle and the radius of the second circle for each decision point with the first quantity of decision points from the backend server.

11. The method as claimed in claim 1, further comprising:

receiving the first request message to request the first quantity of decision points from the vehicle at the backend server;

determining the first quantity of decision points by means of the backend server;

reducing a number of decision points of the first quantity of decision points by the backend server; and sending the reduced first quantity of decision points as the first quantity of decision points in response to the first request message from the backend server to the vehicle.

12. The method as claimed in claim 11, wherein reducing the number of decision points of the first quantity of decision points comprises:

filtering the first quantity of decision points depending on an importance of the decision points; or merging decision points lying within a specified radius or multiple specified radii of circles around a position of the decision point; or determining a specified, maximum number of decision points for the first quantity of decision points, depending on the importance of the decision point.

13. The method as claimed in claim 1, further comprising:

if a distance of the vehicle from a next decision point falls below a specified distance threshold or a time period for reaching the next decision point falls below a specified time threshold, then suppressing at least one of the group consisting of:

the first request message;

the second request message; and a third request message to provide a third quantity of decision points from the vehicle to the backend server.

14. A non-transitory computer-readable medium for providing a quantity of decision points from a backend server to a vehicle during a driving process using the vehicle, wherein the computer-readable medium comprises instructions which, when executed on a control unit or a computer, carry out the method as claimed in claim 1.

15. A system for providing a quantity of decision points from a backend server to a vehicle during a driving process using the vehicle, wherein the system is designed to carry out the method as claimed in claim 1.

16. A vehicle comprising the system for providing a quantity of decision points from a backend server to the vehicle during a driving process using the vehicle, as claimed in claim 15.

17. A method for obtaining a quantity of decision points from a backend server to a vehicle during a driving process using the vehicle, the method comprising:

sending a first request message to request a first quantity of decision points from the vehicle to the backend server;

receiving from the backend server the first quantity of decision points using the vehicle, responsive to the first request message;

determining a traversal of a decision point of the first quantity of decision points using the vehicle; and if a decision point from the first quantity of decision points has been traversed:

sending a second request message to request a second quantity of decision points from the vehicle to the backend server; and receiving from the backend server the second quantity of decision points using the vehicle, responsive to the second request message sending from the vehicle to the backend server a third request message to request a third quantity of decision points, if a time for receiving a response to a latest request exceeds a specified time period.

18. The method as claimed in claim 17, wherein at least one of the first quantity of decision points is a waypoint at which routes driven by the vehicle branch to different navigation targets.

19. The method as claimed in claim 17, wherein the decision point from the first quantity of decision points is a waypoint at which routes driven by the vehicle branch to different navigation targets.

20. A method for providing a quantity of decision points from a backend server to a vehicle during a driving process using the vehicle, the method comprising:

receiving a first request message to request a first quantity of decision points from the vehicle at the backend server;

determining the first quantity of decision points using the backend server;

reducing a number of decision points of the first quantity of decision points by the backend server;

sending the reduced first quantity of decision points as the first quantity of decision points in response to the first request message from the backend server to the vehicle; and wherein the reduction of the number of decision points of the first quantity of decision points comprises:

filtering the first quantity of decision points depending on an importance of the decision points; or merging decision points lying within a specified radius or multiple specified radii of circles around a position of the decision point; or determining a specified, maximum number of decision points for the first quantity of decision points, depending on the importance of the decision point.

* * * * *